Jan. 26, 1965   G. M. RAPATA   3,166,972
EXPANDABLE FASTENER
Filed June 5, 1961   2 Sheets-Sheet 1
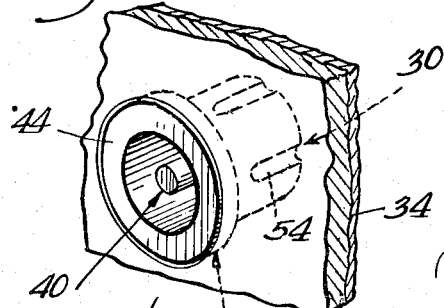
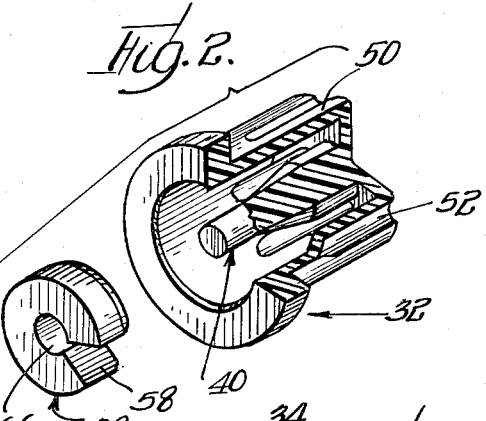
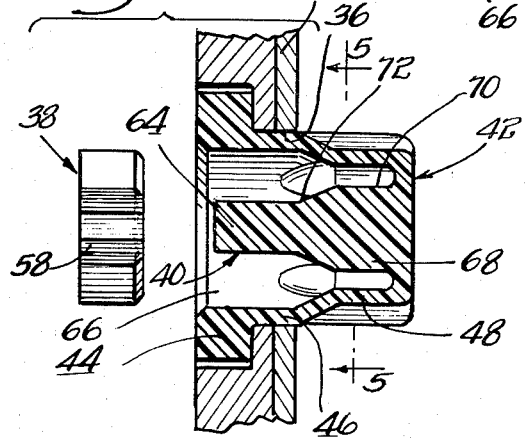
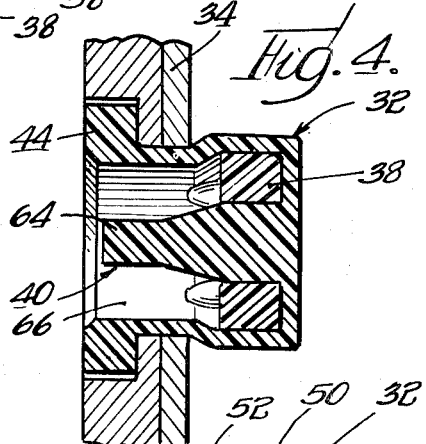
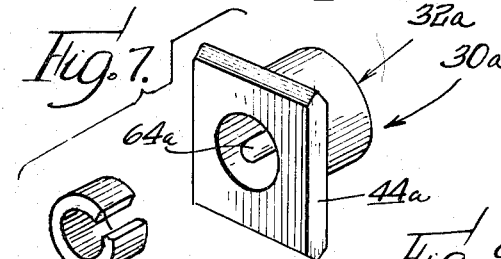
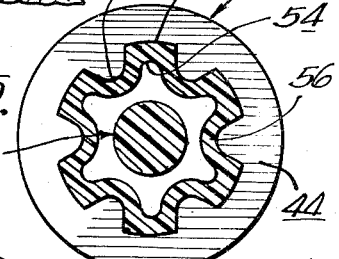
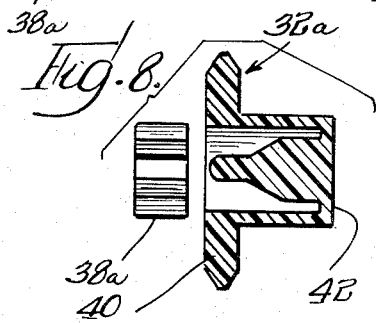
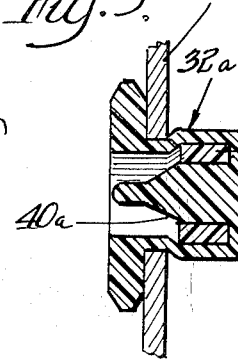
INVENTOR.
George M. Rapata
BY Olson, Trexler,
Wolters & Bushnell
Attys.

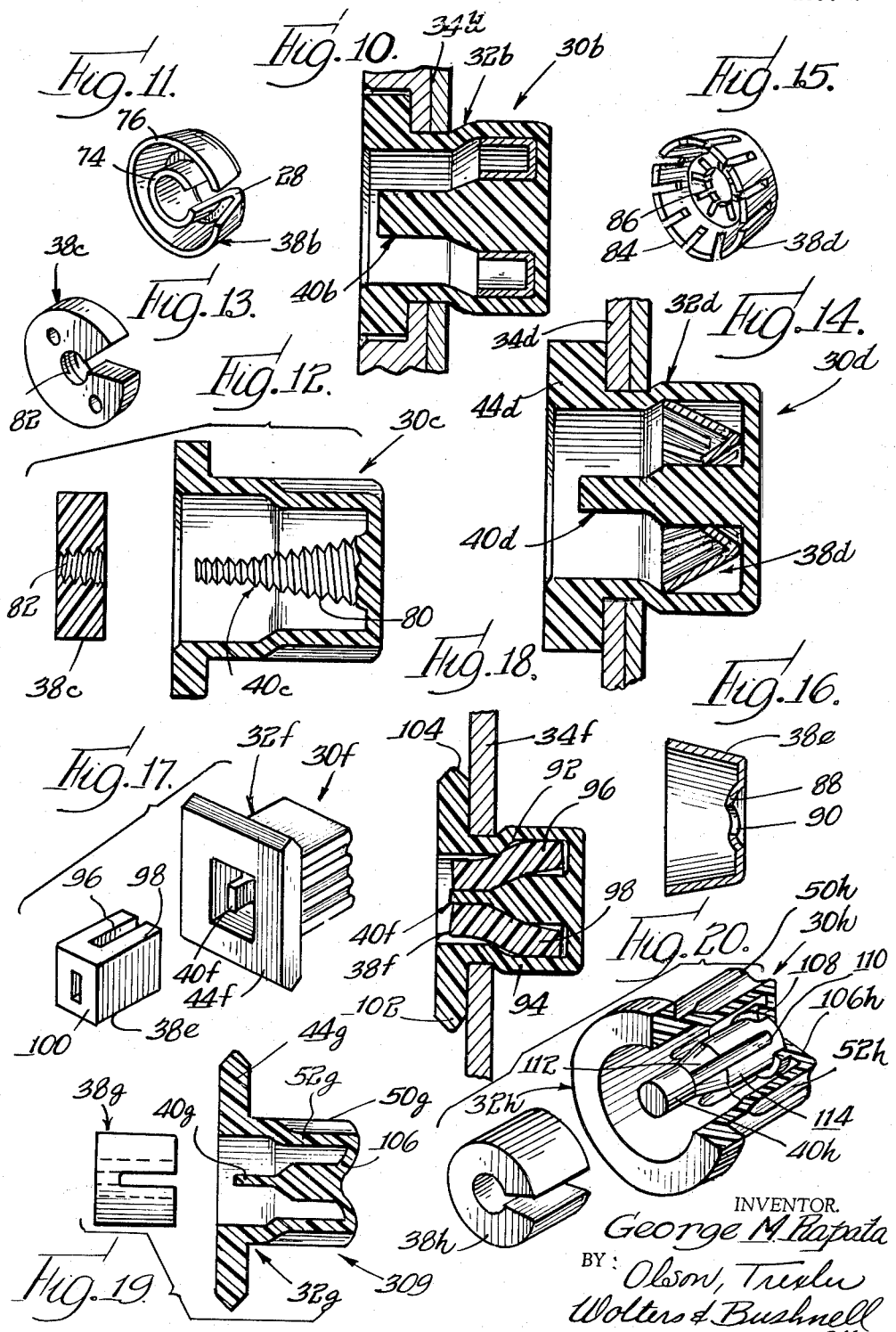

United States Patent Office 3,166,972
Patented Jan. 26, 1965

3,166,972
EXPANDABLE FASTENER
George M. Rapata, Park Ridge, Ill., assignor to Illinois Tool Works Inc., a corporation of Delaware
Filed June 5, 1961, Ser. No. 115,017
10 Claims. (Cl. 85—73)

The present invention relates to a novel fastener or retainer device, and more specifically to a novel fastener adapted to be applied to an apertured work structure from one side thereof without requiring access to the backside of the work structure.

An important object of the present invention is to provide a novel device having an expandable shank portion insertable into an apertured work structure, which shank portion may be easily expanded and positively retained in an expanded condition for preventing disassembly of the device from the work structure.

A more specific object of the present invention is to provide a device of the type contemplated herein having novel means for substantially radially expanding the shank portion of the device and for resisting withdrawal of the shank portion from the apertured work structure.

A further object of the present invention is to provide a novel device of the type described above which may be economically manufactured and assembled.

Other objects and advantages of the present invention will become apparent from the following description and the accompanying drawings wherein:

FIG. 1 is a perspective view showing an assembly including a device incorporating features of the present invention;

FIG. 2 is an exploded perspective view showing the device of FIG. 1;

FIG. 3 is a partial sectional view showing the device in an intermediate stage of assembly with a work structure;

FIG. 4 is a sectional view showing the device fully assembled with a work structure;

FIG. 5 is a sectional view taken along line 5—5 in FIG. 3;

FIG. 6 is a perspective view showing one method of making an element of the device of FIGS. 1–5;

FIG. 7 is an exploded perspective view showing a modified form of the present invention;

FIG. 8 is a partial sectional view of the device as shown in FIG. 7;

FIG. 9 is a sectional view showing the device of FIG. 7 fully assembled with a work structure;

FIG. 10 is a sectional view showing another embodiment of the present invention assembled with a work structure;

FIG. 11 is a perspective view showing an expanding element of the type used in the device shown in FIG. 10;

FIG. 12 is an exploded sectional view showing another embodiment of the present invention;

FIG. 13 is a perspective view of one of the elements of the device shown in FIG. 12;

FIG. 14 is a sectional view showing still another embodiment of the present invention;

FIG. 15 is a perspective view showing the expanding element of the embodiment of FIG. 14;

FIG. 16 is a sectional view showing a further form of the present invention;

FIG. 17 is an exploded perspective view showing another embodiment of the present invention;

FIG. 18 is a sectional view showing the device of FIG. 17 applied to an apertured work structure;

FIG. 19 is an exploded partial sectional view showing another form of the present invention; and FIG. 20 is an exploded perspective view showing still another embodiment of the present invention.

Referring now more specifically to the drawings wherein like parts are designated by the same numerals throughout the various figures, a device 30 incorporating one embodiment of the present invention is shown in FIGS. 1 through 6. The device 30 comprises a one-piece member 32 formed from a tough resilient plastic material such as nylon and adapted to be applied to a work structure 34 having an aperture 36 therethrough. Expanding means is provided for securing the member 32 with respect to the apertured work structure in the manner described in detail below, and in this embodiment the expanding means includes a ring-like element 38 and a cooperable pin element 40.

The member 32 includes a shank portion 42 which is insertable through the workpiece aperture 36. Preferably, the outside diameter of the shank portion 42 is initially substantially uniform throughout its length and similar to the diameter of the workpiece aperture 36 so that the shank portion may be easily inserted into the aperture. A head portion 44 is integrally joined to a trailing end of the shank portion 42 and projects radially outwardly therefrom for overlying and engaging one side of the apertured work structure.

The shank portion 42 has a first section 46 immediately adjacent the head portion 44, which section 46 is preferably provided with an uninterrupted peripheral surface so that the section 46 is adapted to close and seal the workpiece aperture 36. It is to be noted that in accordance with the feature of the present invention, the shank portion 42 includes a section 48 extending from the section 46 and adapted to project beyond the inner surface of the work structure 34, which section 48 has an undulated circular cross sectional configuration as shown best in FIG. 5. In other words, the shank section 48 is formed so as to present a plurality of axially extending and circumferentially spaced narrow ribs 50 separated by axially extending and outwardly facing flutes 52. The ribs 50 are hollowed out by the formation of axially extending internal radially inwardly facing grooves or flutes 54 so that the ribs 50 have a wall thickness similar to the wall thickness of axially extending portion 56 extending between and connecting the ribs.

The expander ring 38 is formed from a suitable resilient and tough material such as metal or various plastics including nylon and is split as indicated at 58. FIG. 6 shows one manner in which expander rings 38 may be quickly and economically formed by cutting them from a length 60 of split tubular stock material.

In this embodiment, the expander pin 40 is formed integrally with the member 32. More specifically, the pin 40 is centrally disposed within the shank portion 42 and annular head portion 44 and is joined to a terminal end wall of the shank portion 42. The pin 40 includes a free end portion 64 having a diameter less than the diameter of an aperture 66 through the center of the expander ring 38. The pin end portion 64 is located at least partially within the annular head portion 44 and also within the adjacent section 46 of the shank portion. The annular head portion 44 and the shank section 46 have a common internal diameter which is preferably at least as great as the external diameter of the expander ring 38 so that the expander ring may be easily telescopically applied over the end portion 64 of the pin and inserted into the annular space 66 disposed between the pin end portion 64 and the inner surface of the head portion 44 and shank section 46.

As shown best in FIGS. 2 and 3, the expander pin 40 is provided with an opposite end portion 68 adjacent the entering end of the shank and preferably located substantially entirely within the shank section 48. The pin section 68 has a diameter substantially greater than the internal diameter of the expander ring 38 while at the same time the minimum internal diameter of the shank section 48 which is defined by the innermost surfaces of the portions 56 is substantially less than the external diameter of the expander ring. Thus, a relatively narrow annular space 70 is defined between the pin end section 68 and the shank section 48.

The expander pin 40 is further provided with an intermediate tapering section 72 which joins the opposite end sections 64 and 68 and traverses the junction between the shank sections 46 and 48. With this structure, it will be appreciated that the device 30 may be easily and quickly assembled with the work structure by first inserting the shank portion 42 through the aperture 36 as shown in FIG. 3 and then forcing the expander ring 38 over the pin 40 to the position shown in FIG. 4. As indicated above, the ring may be relatively easily applied over the reduced diameter outer end portions 64 of the pin. Further inward movement of the ring over the tapered intermediate pin section 72 and onto the inner end section 68 of the pin causes the ring 38 to be expanded sufficiently so that its outer diameter becomes larger than the diameter of the inner surface of the head portion 44 and shank section 46. This causes expansion of the shank section 48 behind the work structure so that the expanded shank section and the expanded ring element 38 provide means engaging behind the work structure and positively preventing removal of the device from the work structure. It is to be noted that, as a result of the undulated or fluted construction of he shank section 48, expansion thereof may be accomplished relatively easily. One reason for this is that the expander ring 38 initially primarily engages the portions 56 of the shank section which are flexed outwardly between the rib portion so as to promote an increase in the circumference of the shank section and a resulting radial expansion thereof.

FIGS. 7, 8 and 9 show an embodiment of the present invention similar to the structure described above as indicated by the application of identical reference numerals with the suffix *a* added to corresponding elements. In this embodiment, the expander ring 38*a* is in the form of a relatively strong spring metal element having a normal diameter larger than the internal diameter of the head portion 44*a* and the shank portion 42*a*. During assembly of the device, the ring element 38*a* is first radially collapsed for insertion into the member 32*a*. When the expander element 38*a* is advanced beyond the inner surface of the work surface, the inherent resiliency of the spring expander element along with the action of the complementary pin 40*a* causes the desired expansion of the shank portion beyond the work structure. This embodiment further shows certain features of this invention may be used to expand shank portions which do not incorporate the fluted construction of the device described above even though as a result, expansion of the shank portion may be relatively difficult.

FIGS. 10 and 11 show a device 30*b* which is similar to the structures described above, as indicated by the application of identical reference numerals with the suffix *b* added to corresponding elements. This embodiment, in which the exposed end section of the shank portion may or may not be fluted, as desired, differs primarily in that the expanded element 38*b* is formed of spring sheet metal in a manner so as to provide inner and outer ring sections 74 and 76 respectively joined by a bight portion 78 so as to obtain a stronger spring action.

FIGS. 12 and 13 show a device 30*c* which is similar to the structures described above as indicated by the application of identical reference numerals with the suffix *c* added to corresponding elements. This embodiment differs primarily in that helical thread convolutions 80 are formed along the surface of the expander pin 40*c* and complementary thread convolutions 82 are formed in the internal wall of the expander ring 38*c*. Thus, the ring 38*c* is adapted to be axially advanced into the shank portion 42 by rotating it and threading it onto the pin 40*c*. FIGS. 14 and 15 show a further embodiment of the present invention which is similar to the structures described above as indicated by the application of identical reference numerals with the suffix *d* added to corresponding elements. In this embodiment, the expander element 38*d* is generally cup-shaped and may be provided with peripherally disposed prongs 84 or internal prongs 86 or both for respectively biting into the shank portion or the pin as shown in FIG. 14 positively for preventing removal of the expander element.

FIG. 16 shows an expander element 38*e* having an internal marginal portion 88 substantially helically deflected so as to present a helical thread convolution 90. This generally cup-shaped split ring expander element may be threaded onto a pin having preformed threads such as that shown in FIG. 12. Alternatively, the expander element 38 may be turned onto an unthreaded pin and the relatively sharp edge of the sheet metal thread convolution 90 will cut or form a complementary thread in the surface of the pin.

FIGS. 17 and 18 show a device 30*f* which is similar to the structures described above as indicated by the application of identical reference numerals with the suffix *f* added to corresponding elements. This embodiment shows how features of the present invention may be incorporated in a device having a shank portion with a polygonal or rectangular cross sectional configuration rather than a circular configuration. In this embodiment, a single pair of oppositely disposed fluted side portions 92 and 94 of the shank are expanded upon insertion of the expander element 38*e* which has a rectangular cross sectional configuration. The expander element 38*e* is split along only a portion of the length thereof so as to provide a pair of opposed flexible sections 96 and 98 which are integrally joined with a circumferentially continuous trailing end section 100.

The head portion 44*f* of the device 30*f* is provided with means for engaging and retaining workpieces such as channel shaped molding strips, not shown. Thus, the head portion is provided with beveled surfaces 102 and 104 along opposite margins thereof, which surfaces are adapted to overlie and engage in turn marginal flanges of a molding strip in a manner which will be understood by those skilled in the art. It will also be appreciated that all of the other embodiments disclosed herein may be provided with head portions suitable for retaining molding strips or other work pieces.

FIG. 19 shows a device 30*g* which is similar to the embodiments described above as indicated by the application of identical reference numerals with the suffix *g* added to corresponding parts. In this embodiment, the shank portion 42*g* is provided with a dished or concave end wall 106, and the axially extending ribs and flutes along the sides of the shank portion extend at least partially into the end wall 106 for facilitating expansion of the shank portion, particularly adjacent the entering extremity thereof.

FIG. 20 shows another embodiment incorporating features of the present invention, which embodiment is similar to the structures described above as indicated by the application of identical reference numerals with the suffix *h* added to corresponding elements. In this embodiment, the expander pin 40*h* is formed separately from the member 32*h*. Preferably, a socket 108 is formed along the inner side of the end wall 106*h* of the shank portion for receiving and locating the expander pin. In addition, the expander pin which is formed from a tough resilient material which may be plastic or any other suitable material, is split as at 110. The slot 110 extends axially and terminates short of the opposite ends of the pin so as to provide the pin with opposite resilient side sections 112 and 114. These side sections are adapted resiliently to collapse when the expander ring 38*h* is assembled over the pin and then to provide a resilient force or spring action tending to expand the ring 38*h* and the shank portion of the device. It is to be understood that the expander pins of the other embodiments disclosed herein may also be formed separately from the shank portion and may be split in substantially the same manner as the pin 40*h*.

While the preferred embodiments of the present invention have been shown and described herein, it is obvious that many structural details may be changed without departing from the spirit and scope of the appended claims.

The invention is claimed as follows:

1. A device of the type described for application to a work structure having an aperture therethrough comprising a resilient plastic member including a head portion for overlying one side of a work structure and a hollow expandable shank portion extending axially from said head portion for insertion through the work structure aperture, said member having an axial opening through said head portion and into said shank portion, an axially extending expander pin element centrally located within said hollow shank portion and spaced from inner surfaces of side walls of said shank portion, means connecting an entering end of said pin element with an entering end of said shank portion, said pin element including a free end extending adjacent to said head portion, and a resilient expander element insertable through said opening in said head portion and having a generally centrally located opening therein for receiving said pin element, one of said elements being tapered for causing expansion of said expander element and said shank portion upon application of the expander element telescopically over said pin element, said side wall of said shank portion including generally axially extending flute means for facilitating expansion of the shank portion, said shank portion including a generally dish-shaped transverse wall at an entering extremity thereof, and said flute means extending partially into said transverse wall.

2. A device of the type described for application to a work structure having an aperture therethrough comprising a resilient plastic member including a head portion for overlying one side of a work structure and a hollow expandable shank portion extending axially from said head portion for insertion through the work structure aperture, said member having an axial opening through said head portion and into said shank portion, an axially extending expander pin element centrally located within said hollow shank portion and spaced from inner surfaces of walls of said shank portion, means connecting an entering end of said pin element with an entering end of said shank portion, said pin element including a free end adjacent said head portion, and a resilient expander element insertable through said opening in said head portion and having a generally centrally located opening therein for receiving said pin element, one of said elements being tapered for causing expansion of said expander element and said shank portion upon application of the expander element telescopically over said pin element, said expander element being axially split, and said expander element being internally threaded and said pin element being externally threaded for interengagement for positively resisting removal of the expander element from the pin element.

3. A device of the type described for application to a work structure having an aperture therethrough comprising a one piece resilient non-metallic plastic member including a head portion for overlying one side of a work structure and a hollow expandable circumferentially continuous shank portion extending axially from said head portion for insertion through the work structure aperture, said member having an axial opening through said head portion and into said shank portion, an axially extending expander pin element centrally located within said hollow shank portion and spaced from inner surfaces of walls of said shank portion, an end wall connecting the entering end of said pin element with the entering end of said shank portion, said pin element including a free end portion of relatively small diameter in the vicinity of said head portion, and a split ring expandable element insertable through said opening in said head portion and having an opening therein for receiving said pin element, said pin having a portion of larger diameter joined with said free end portion of smaller diameter by a tapered portion for causing expansion of said expander element and the adjacent area of said shank portion upon application of the expander element telescopically over said pin element, the axial extent of the expander element being substantially less than the axial extent of said shank portion and not substantially greater than the length of the pin portion of larger diameter whereby to enable said element to be trapped within the entering extremity of the hollow shank portion upon complete insertion within the apertured work structure.

4. A device of the type described for application to a work structure having an aperture therethrough comprising a resilient plastic member including a head portion for overlying one side of a work structure and a hollow expandable shank portion extending axially from said head portion for insertion through the work structure aperture, said member having an axial opening through said head portion and into said shank portion, an axially extending expander pin element centrally located within said hollow shank portion and spaced from inner surfaces of side walls of said shank portion, means connecting an entering end of said pin element with an entering end of said shank portion, said pin element including a free end extending into axial overlapping relationship with said head portion, and a resilient expander element insertable through said opening in said head portion and having a generally centrally located opening therein for receiving said pin element, one of said elements being tapered for causing expansion of said expander element and said shank portion upon application of the expander element telescopically over said pin element, said side walls of said shank portion including generally axially extending flute means for facilitating expansion of the shank portion, said flute means being positioned along said shank opposite said pin and including axially extending ribs, said ribs being separated by outwardly facing flutes, said ribs and flutes having a substantially equal wall thickness.

5. A device, as defined in claim 4, wherein said pin element is integrally joined to said member.

6. A device, as defined in claim 4, wherein said pin element is axially split and includes resilient sections for promoting expansion of said expander element and said shank portion.

7. A device, as defined in claim 4, wherein said pin element is fixed with respect to said shank portion, and said resilient expander element includes means for engaging said pin element and positively resisting removal of said resilient expander element from said pin element.

8. A device, as defined in claim 7, wherein said last named means comprises prong means.

9. A device, as defined in claim 4, wherein said expander element comprises a split ring.

10. A device, as defined in claim 9, wherein said split ring includes radially spaced generally axially expanding split annular sections joined by a bight portion.

References Cited by the Examiner

UNITED STATES PATENTS

| | | |
|---|---|---|
| 690,284 | 12/01 | Hicks. |
| 1,268,405 | 6/18 | Stoute. |
| 2,435,876 | 2/48 | De Swart. |
| 2,873,454 | 2/59 | Phillips. |
| 3,030,850 | 4/62 | Minor. |

FOREIGN PATENTS 855,297 11/60 England.

EDWARD C. ALLEN, *Primary Examiner*.